(12) United States Patent
Shi et al.

(10) Patent No.: US 11,804,625 B2
(45) Date of Patent: Oct. 31, 2023

(54) LITHIUM-ION BATTERY THERMAL MANAGEMENT SYSTEM AND METHOD BASED ON PHASE CHANGE MATERIAL AND MUTUALLY EMBEDDED FINS

(71) Applicant: University of Nottingham Ningbo China, Ningbo (CN)

(72) Inventors: Yong Shi, Ningbo (CN); Guanyi Chen, Ningbo (CN); Hanyang Ye, Ningbo (CN)

(73) Assignee: University of Nottingham Ningbo China, Ningbo (CN)

( * ) Notice: Subject to any disclaimer, the term of this patent is extended or adjusted under 35 U.S.C. 154(b) by 0 days.

(21) Appl. No.: 18/148,071

(22) Filed: Dec. 29, 2022

(65) Prior Publication Data
US 2023/0216102 A1 Jul. 6, 2023

(30) Foreign Application Priority Data
Dec. 31, 2021 (CN) .......................... 202111655399.3

(51) Int. Cl.
| | |
|---|---|
| *H01M 10/6551* | (2014.01) |
| *H01M 10/613* | (2014.01) |
| *H01M 10/615* | (2014.01) |
| *H01M 10/633* | (2014.01) |
| *H01M 10/635* | (2014.01) |
| *H01M 10/6556* | (2014.01) |
| *H01M 10/0525* | (2010.01) |

(52) U.S. Cl.
CPC ... *H01M 10/6551* (2015.04); *H01M 10/0525* (2013.01); *H01M 10/613* (2015.04); *H01M 10/615* (2015.04); *H01M 10/633* (2015.04); *H01M 10/635* (2015.04); *H01M 10/6556* (2015.04)

(58) Field of Classification Search
CPC ......... H01M 10/6551; H01M 10/0525; H01M 10/613; H01M 10/615; H01M 10/633; H01M 10/635; H01M 10/6556
USPC .......................................................... 429/120
See application file for complete search history.

(56) References Cited

U.S. PATENT DOCUMENTS

| | | | | |
|---|---|---|---|---|
| 2011/0189525 A1* | 8/2011 | Palanchon | .......... | H01M 10/659 165/81 |
| 2021/0159558 A1* | 5/2021 | Kim | .................... | H01M 10/486 |

FOREIGN PATENT DOCUMENTS

| | | |
|---|---|---|
| CN | 110994073 A | 4/2020 |
| CN | 112542631 A1 | 3/2021 |
| CN | 113097594 A | 7/2021 |

\* cited by examiner

*Primary Examiner* — Gary D Harris
(74) *Attorney, Agent, or Firm* — Laurence A. Greenberg; Werner H. Stemer; Ralph E. Locher

(57) ABSTRACT

A lithium-ion battery thermal management system and method based on PCM and mutually embedded fins. The thermal management system includes a battery box, a lithium-ion battery pack and a temperature detection unit are arranged in the battery box; the lithium-ion battery pack at least includes two cells, the periphery of each cell is wrapped by a battery inner shell and a battery outer shell, and PCM is filled between the battery inner shell and the battery outer shell; a plurality of fins are arranged on the battery outer shell on the opposite sides of the two adjacent cells, the fins are arranged at intervals, the fins on the opposite sides of the two adjacent cells are arranged in a staggered manner, and heat-conducting plates are connected between each fin and the battery inner shell.

7 Claims, 4 Drawing Sheets

LITHIUM-ION BATTERY THERMAL MANAGEMENT SYSTEM AND METHOD BASED ON PHASE CHANGE MATERIAL AND MUTUALLY EMBEDDED FINS

CROSS-REFERENCE TO RELATED APPLICATION

This application claims the priority, under 35 U.S.C. § 119, of China Patent Application CN 202111655399.3, filed Dec. 31, 2021; the prior application is herewith incorporated by reference in its entirety.

FIELD AND BACKGROUND OF THE INVENTION

The present disclosure belongs to the technical field of battery thermal management, and specifically relates to a lithium-ion battery thermal management system and method based on a phase change material and mutually embedded fins.

As one of new generation energy conversion technologies, lithium-ion battery has been extensively studied and applied to a large variety of important industries, such as new electronic equipment and new energy vehicles. Especially in recent years, the increasing demand for energy consumption puts forward higher requirements regarding the performance, reliability and lifespan of the currently used lithium-ion batteries. However, it should be noted that lithium-ion battery is highly sensitive to its operating temperature and the temperature distributions in the cell. When the operating temperature is excessive low, the electrochemical reaction rate of lithium-ion battery substantially declines during the discharge, leading to rather poor discharging performance. When the ambient temperature is lower than 0° C., the charging of lithium-ion battery can easily cause a short circuit between its positive and negative electrodes, and even lead to explosion if no sufficient caution is paid. On the other hand, when a lithium-ion battery is repeatedly charged at a high ambient temperature (e.g., 50° C.), the cycle life of the lithium-ion battery is rapidly shortened, and a large amount of heat is accumulated inside the cells of the lithium-ion battery, resulting in serious uneven internal temperature distributions. If no timely improvement is made under such working circumstances, the lithium-ion battery suffers from the thermal runaway or even serious safety accidents, such as self-ignition. Therefore, it is desirable to provide an effective thermal management system and control method for lithium-ion batteries, which operate at various ambient temperatures or/and different charging/discharging rates, so that it is ensured that those lithium-ion batteries always work in a reasonable temperature range and their internal temperature differences are small.

Currently, the conventional thermal management approaches for lithium-ion battery can be divided into three types, i.e., air-based, liquid-based and phase change material (PCM)-based schemes. The air-based and liquid-based thermal management systems are widely used. The fundamental working principle is to drive air or liquid to flow through the given channels (which can be either closed or open) among the cells so as to cool down or heat up the overheated or overcooled batteries. The air-based thermal management system has a simple structure, and low maintenance cost. However, the overall heat transfer efficiency is not high, so that a large amount of heat generated by the lithium-ion batteries cannot be quickly dissipated to maintain small temperature differences inside the batteries or among the batteries. The heat transfer performance of thermal management system can be effectively improved by replacing air with liquid. However, the design of the liquid-based system turns relatively complicated, and the maintenance cost is also high. Further, if the used liquid coolant is electrically conductive, it is required to prevent the whole thermal management system from liquid leakage, and avoid any possible short circuit. In recent years, PCM-based thermal management as a passive approach has been gradually used in various applications of lithium-ion battery. Different from air and liquid, PCM usually does not need extra power to carry out forced convection, and its thermal management working principle is just to take advantage of the latent heat from the PCM solid-liquid phase change. When the battery temperature reaches or slightly exceeds the melting point of the PCM, the PCM begins melting, during which a large amount of heat generated by the battery is absorbed and stored in the form of latent heat. When the battery temperature drops below the melting point, the liquid PCM is gradually solidified to release latent heat, thereby causing the decreasing rate of the battery temperature to be slowed down. In general, the PCM-based thermal management scheme has a simple system design and requires low cost. Nevertheless, the actual available amount of the PCM and the resulting thermal management capability are strictly limited to the available space of the battery pack. More importantly, when the ambient temperature of the lithium-ion battery goes beyond the PCM melting point, the PCM is completely liquefied, so that its high-efficiency heat dissipation capacity cannot be achieved through the solid-liquid phase change. It should also be noted that the liquid PCM has low thermal conductivity, and thus the corresponding thermal management system usually needs to be equipped with other cooling means to dissipate the battery heat. These cooling means, however, often cannot effectively meet the thermal preservation requirement of lithium-ion battery at low temperatures.

SUMMARY OF THE INVENTION

Therefore, one important yet unsolved issue in the study on lithium-ion batteries for electric vehicles is that how to develop a thermal management system, which can make full use of the efficient heat-storage characteristic of PCM based on its phase change, and fulfill different thermal demands (e.g., dissipating heat at a high temperature and preserving heat at a low temperature) of lithium-ion batteries operating at high and low ambient temperatures.

Aiming at the defects in the prior art, the present disclosure provides a lithium-ion battery thermal management system and method based on PCM and mutually embedded fins, which solves the problem that those existing PCM-based thermal management systems fail to fulfill multiple thermal demands of lithium-ion batteries operating at different ambient temperatures and under various working conditions.

In order to achieve the above-mentioned purpose, the present disclosure is realized through the following technical scheme.

The present disclosure first provides a lithium-ion battery thermal management system based on PCM and mutually embedded fins. The thermal management system includes a battery box, which is provided with a lithium-ion battery pack and a temperature detection unit therein, the temperature detection unit is electrically connected with a controller; the lithium-ion battery pack at least includes two cells, the periphery of each cell is wrapped by a battery inner shell and a battery outer shell, and PCM is filled between the battery inner shell and the battery outer shell; a plurality of fins are arranged on the battery outer shells on the opposite sides of two adjacent cells, the fins are arranged at intervals, the fins on the opposite sides of the two adjacent cells are arranged in a staggered manner, and heat conducting plates are connected between each fin and the battery inner shell;

The thermal management system also includes a driving device, and the driving device is electrically connected with the controller and used to drive the two adjacent cells to move towards or apart from each other so that the two adjacent cells are at least arranged at a heat exchange position or a thermal preservation position. When the two adjacent cells are at the heat exchange position, the fins, which are located on the opposite sides of two adjacent cells and are arranged in a staggered manner, are separated from each other to form a first heat exchange channel. When two adjacent cells are at the thermal preservation position, the fins, which are located on the opposite sides of two adjacent cells and are arranged in a staggered manner, move towards each other and are mutually embedded to close the first heat exchange channel.

Optionally, a first incoming air unit is provided on the inner side of the battery box, the first incoming air unit is electrically connected with the controller, a vent of the first incoming air unit is arranged at one end of the first heat exchange channel, and a flow direction of air from the vent is consistent with the extension direction of the first heat exchange channel.

Optionally, the first outgoing air unit is also provided on the surfaces of the battery box, the first outgoing air unit is arranged at another end, away from the first incoming air unit, of the first heat exchange channel, and the first incoming air unit and the first outgoing air unit work together to at least enhance the heat transfer efficiency of the first heat exchange channel.

Optionally, the lithium-ion battery pack further includes a first battery pack and a second battery pack which are arranged side by side, and each battery pack has at least two cells provided therein; the driving device is further configured for driving the first battery pack and the second battery pack to move towards or apart from each other; and a second heat exchange channel is formed after the first battery pack and the second battery pack move apart from each other.

Optionally, the surface of the battery box is further provided with a second incoming air unit and a second outgoing air unit, the second incoming air unit and the second outgoing air unit are electrically connected with the controller, to at least implement heat transfer between the air in the second heat exchange channel and battery box and the external air in the surrounding environment.

Optionally, the driving device includes a base, the base is arranged on the inner surface of the bottom of the battery box, the base is rotatably connected with a first bidirectional screw rod, one end of the first bidirectional screw rod penetrates through the battery box and then is in transmission connection with a motor, and the motor is electrically connected with the controller; two ends of the first bidirectional screw rod are in threaded connection with a first sliding seat and a second sliding seat, respectively, and the first sliding seat and the second sliding seat have the same structure and are slidably connected with the base; the second sliding seat is rotatably connected with a second bidirectional screw rod, two ends of the second bidirectional screw rod are equipped with gears, racks are fixed at the edges on the two sides of the base, and the racks mesh with the gears; and the two ends of the second bidirectional screw rod are in threaded connection with a first dragging plate and a second dragging plate, respectively, the first dragging plate and the second dragging plate are slidably connected with the second sliding seat, and the cells are placed on the top surface of the first dragging plate and the top surface of the second dragging plate, respectively.

Optionally, an immovable plate is fixed at the top surface of the second sliding seat, the immovable plate is located between the first dragging plate and the second dragging plate, and a cell is also placed on the top surface of the immovable plate.

Next, the present disclosure provides a management method of the lithium-ion battery thermal management system based on PCM and mutually embedded fins, including the following steps:

detecting the real-time temperature of the surface of at least one cell by the temperature detection unit, and transmitting the real-time temperature to the controller, where the following judgments are made based on the received real-time temperature:

when the real-time temperature is less than or equal to a second predetermined temperature, the controller detects the current position state of the cell, controls the cell to keep at the current position state if the cell is at the thermal preservation position; and controls the driving device to drive the cell to be switched to the thermal preservation position if the cell is at the heat exchange position; or when the real-time temperature is greater than the second predetermined temperature and less than a third predetermined temperature, the controller controls the cell to keep at the current position state; or when the real-time temperature is greater than or equal to the third predetermined temperature, the controller detects the current position state of the cell, controls the cell to keep at the current position state if the cell is at the heat exchange position; and controls the driving device to drive the cell to be switched to the heat exchange position if the cell is at the thermal preservation position;

wherein, the second predetermined temperature is greater than the minimum temperature at which the lithium-ion battery is allowed to operate normally, and less than the third predetermined temperature, and the third predetermined temperature is less than the maximum temperature at which the lithium-ion battery is allowed to operate normally.

Optionally, the following judgments are made by the controller based on the received real-time temperature:

when the real-time temperature is greater than or equal to a fourth predetermined temperature, the controller is further configured for controlling the start of the first incoming air unit, and introducing a cooling medium into the first heat exchange channel;

wherein, the fourth predetermined temperature is greater than the third predetermined temperature, but still less than the maximum temperature at which the lithium-ion battery is allowed to operate normally.

Optionally, the following judgments are made by the controller based on the received real-time temperature:

when the real-time temperature is less than or equal to a first predetermined temperature, the controller detects the current position state of the cell, controls the cell to keep at the current position state if the cell is at the heat exchange position; and controls the driving device to drive the battery cell to be switched to the heat exchange position if the battery cell is at the thermal preservation position; meanwhile, the controller is further configured for controlling the start of the first incoming air unit and introducing a heating medium into the first heat exchange channel;

wherein, the first pre-determined temperature is less than the second predetermined temperature.

Through the above-mentioned technical scheme, the present disclosure has the following beneficial effects.

First, according to the working environment temperature of the lithium-ion battery and the operating conditions of the battery, appropriate thermal management can be provided for the lithium-ion battery. When the lithium-ion battery works in a moderate-temperature environment, the PCM absorbs the heat generated by the battery. When the battery temperature rises up to the melting point of the PCM, such PCM performs solid-liquid phase change while absorbing heat. In this process, the waste battery heat absorbed by the PCM is converted into latent heat and stored. When the lithium-ion battery works in a high-temperature environment (higher than the melting point of the PCM), all the PCM in the system is completely liquefied. Due to the low thermal conductivity of the liquid-phase PCM, the battery working in high-temperature conditions cannot be effectively cooled down. In this scenario, the adjacent cells move apart from each other, so that the fins on the battery outer shell are separated from each other to form the heat exchange channel. The incoming and outgoing air units are opened to allow the air to flow through the heat exchange channel, and the heat emitted by the cells is quickly taken away by the air forced convection, thereby improving the heat dissipation of the lithium-ion battery. When the lithium-ion battery works in a low-temperature environment, all the incoming and outgoing air units are closed, and the adjacent cells move towards each other, so that the fins on the battery outer shell are mutually embedded. The PCM filled in the fin structures is solidified in the low-temperature environment, and the stored latent heat is released to provide thermal protection for the corresponding cells, so that the temperature decreasing rate of the lithium-ion battery in the working or idle mode in the low-temperature environment is slowed down. When the lithium-ion battery needs to operate again after being placed in the low-temperature environment for a long while, the incoming and outgoing air units are turned on in advance and the heating device is started to heat the air, and the adjacent cells move apart from each other, so as to separate the fins on the battery outer shells to form the heat exchange channel, and the heated air flows through the heat exchange channel to provide heat to the battery and facilitate the temperature rise to a reasonable level, and then the battery is turned on again. When lithium-ion battery is charged and discharged at a high rate, the PCM cannot quickly absorb a large amount of heat generated by the battery due to its low thermal conductivity, resulting in a fast rise of the battery temperature. By adding heat-conducting plates with high thermal conductivity into the PCM, the heat can be quickly transferred from the surface of the battery to the battery outer shell and in turn is quickly taken away by forced convection of the air in the heat exchange channel, thereby achieving rapid heat dissipation of the battery. This design effectively ensures that lithium-ion battery can obtain ideal working temperature and temperature gradient in its cell at different working environment temperatures and under high-rate charging and discharging conditions.

Second, the present disclosure has taken full advantage of the flexibility of the mutually embedded fins. When lithium-ion batteries generate heat at a fast rate or operate in a high-temperature environment, the adjacent cells can be quickly separated from each other to form a heat exchange cooling channel, so that the cooling demand of rapid dissipation of considerable heat from the batteries is satisfied. Furthermore, the adjacent cells can be quickly mutually embedded in a low-temperature environment, and the heat exchange channel is closed to form a PCM-based thermal preservation layer, so that thermal protection for the lithium-ion batteries from low temperatures is provided.

Third, the air cooling system is further used, and heat can be quickly taken away by the air forced convection once the heat exchange channel is formed, so that the heat dissipation requirement of the battery in a high-temperature environment and in the high-rate charging and discharging conditions is preferably met.

Fourth, the air heating system is further used, and warm air can be blown into the battery box and the battery pack in the box at low temperatures to raise their temperatures, so that effective thermal protection is provided for the battery starting or working at low temperatures.

In order to more clearly illustrate the detailed description of the present disclosure or the technical solutions in the prior art, the drawings, which need to be used in the detailed description or the prior art description, are briefly described below. Similar elements or portions are generally identified by similar reference signs throughout all attached figures. The dimensions of the various components or parts shown in the attached figures are not drawn to scale in practice.

DETAILED DESCRIPTION OF THE INVENTION

Figure 1:
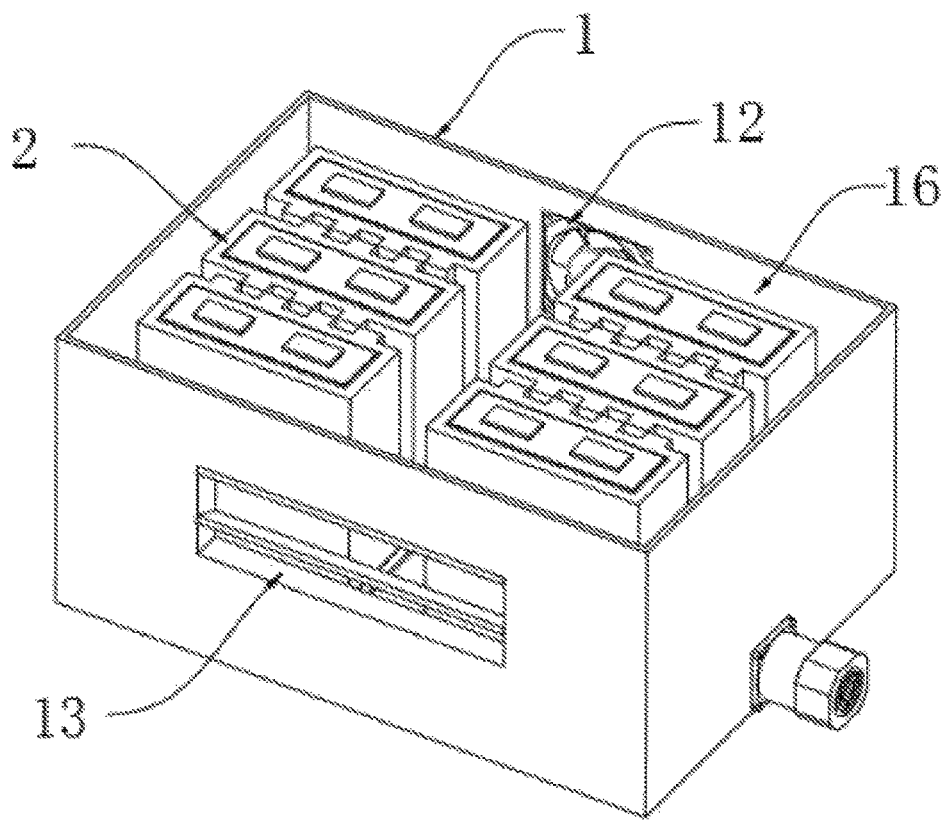
FIG. 1 is a schematic diagram of a stereostructure of a lithium-ion battery thermal management system based on PCM and mutually embedded fins.

The following reference numerals and symbols in the figures of the drawing pertain to the following:

1, battery box; 2, lithium-ion battery pack; 3, driving device;

11, first incoming air unit; 12, second incoming air unit; 13, second outgoing air unit; 14, first heat exchange channel; 15, second heat exchange channel; 16, third heat exchange channel; 21, first battery pack; 22, second battery pack; 23, cell; 24, battery inner shell; 25, battery outer shell; 26, PCM; 31, base; 32, motor; 33, first sliding seat; 34, second sliding seat; 35, first dragging plate; 36, second dragging plate; 37, immovable plate;

241, heat-conducting plate; 251, fin; 311, first bidirectional screw rod; 312, rack; 341, second bidirectional screw rod; 342, gear; and 343, first ventilation hole.

The following describes the embodiments of technical solutions of the present disclosure in detail with reference to the attached figures. The following embodiment serves only to more clearly illustrate the technical solutions of the present disclosure, and therefore, as an example only and cannot limit the scope of protection of the present disclosure in this way.

Referring to FIG. 1, a lithium-ion battery thermal management system based on PCM and mutually embedded fins provided by the present disclosure includes a battery box 1. A lithium-ion battery pack 2 and a temperature detection unit are arranged in the battery box 1, and the temperature detection unit is electrically connected with a controller and used for detecting the real-time temperature of the lithium-ion battery pack 2. Specifically, referring to FIG. 3 and FIG. 4, the lithium-ion battery pack 2 at least includes two cells 23. The periphery of each cell 23 is wrapped by a battery inner shell 24 and a battery outer shell 25. The PCM 26 is filled between the battery inner shell 24 and the battery outer shell 25. A plurality of fins 251 are arranged on the battery outer shell 25 on the opposite sides of the two adjacent cells 23. The fins 251 are flange-shaped and are integrally arranged with the battery outer shell 25. The fins 251 are arranged at intervals. The fins 251 on the opposite sides of the two adjacent cells 23 are arranged in a staggered manner. Heat-conducting plates 241 are connected between each fin 251 and the battery inner shell 24. The thermal conductivity of the heat-conducting plates 241 is higher than that of the PCM 26, and the heat-conducting plates 241 can be made of high thermal conductivity materials such as metal fins, metal foam and graphene. The heat of the battery inner shell 24 can be quickly transferred to the battery outer shell 25.

Wherein, the lithium-ion battery thermal management system further includes a driving device 3. The driving device 3 is electrically connected with the controller and configured for driving the two adjacent cells 23 to move towards or apart from each other so that the two adjacent cells 23 are at least arranged at a heat exchange position or a thermal preservation position. When the two adjacent cells 23 are at the heat exchange position, the fins 251, which are located on the opposite sides of two adjacent cells 23 and are arranged in a staggered manner, are separated from each other to form a first heat exchange channel 14. The heat of the cell 23 is transferred to the battery outer shell 25 through the battery inner shell 24, the heat-conducting plates 241 and the PCM 26, and then the heat is quickly taken away by forced convection of the air in the first heat exchange channel 14, so that the purpose of battery heat dissipation at high temperatures is achieved. When the two adjacent cells 23 are at the thermal preservation position, the fins 251, which are located on the opposite sides of two adjacent cells 23 and are arranged in a staggered manner, move towards each other and are mutually embedded to close the first heat exchange channel 14, so that the heat released by solidification of the PCM 26 at low temperatures can flow back into the battery, and meanwhile, the heat loss of the whole battery pack to the surroundings is reduced, so that the purpose of thermal protection of the battery pack from low temperatures is achieved.

The structural characteristics of the mutually embedded fins are flexibly utilized, and the adjacent cells 23 can be driven to move apart from each other under the circumstances, where the battery generates the heat at a fast rate or operates in a high-temperature working environment. The fins 251 of the adjacent cells can be quickly separated from each other to form a heat exchange channel. This heat exchange channel, together with air cooling, can well fulfil the needs to rapidly dissipate the battery heat at high temperatures. For the battery working in a moderate-temperature environment, the PCM 26 between the battery inner shell 24 and the battery outer shell 25 absorbs the heat by the solid-liquid phase change, and the heat generated by the battery is taken away immediately. For the battery in a low-temperature environment, the adjacent cells 23 move towards each other, and the fin structures are quickly mutually embedded, so that the heat exchange channel is closed. The PCM in the fin structures is solidified to release heat at low temperatures, so that a low-temperature thermal protection is provided for the battery pack.

According to the working environment temperature of the lithium-ion battery and the operating conditions of the battery, appropriate thermal manage of the lithium-ion battery is carried out. When the lithium-ion battery works in a moderate-temperature environment, the PCM absorbs the heat generated by the battery. When the battery temperature rises up to the melting point of the PCM, such PCM performs the solid-liquid phase change while absorbing the heat. In this process, the waste battery heat absorbed by the PCM is converted into latent heat and stored. When the lithium-ion battery works in a high-temperature environment (higher than the melting point of the PCM), all the PCM in the system is completely liquefied. Due to the low thermal conductivity of the liquid-phase PCM, the battery working in the high-temperature conditions cannot be effectively cooled down. In this scenario, the adjacent cells move apart from each other, so that the fins on the battery outer shell are separated from each other to form the heat exchange channel. The incoming and outgoing air units are opened to allow the air to flow through the heat exchange channel, and the heat emitted by the battery can be quickly taken away by air forced convection, thereby improving the heat dissipation of the lithium-ion battery. When the lithium-ion battery works in a low-temperature environment, all the incoming and outgoing air units are closed, and the adjacent cells move towards each other, so that the fins on the battery outer shell are mutually embedded. The PCM filled in the fin structures is solidified in the low-temperature environment, and the stored latent heat is released to provide thermal protection for the corresponding cells, so that the temperature decreasing rate of the lithium-ion battery is slowed down when the battery is working or idle in the low-temperature environment. When the lithium-ion battery needs to operate again after being placed in the low-temperature environment for a long while, the incoming and outgoing air units are turned on in advance and the heating device is started to heat the air, and the adjacent cells move apart from each other, so that the fins on the battery outer shell are separated from each other to form the heat exchange channel, and the heated air flows through the heat exchange channel to provide heat to the battery and facilitate the temperature rise to a reasonable level, and then the battery is turned on again. When the lithium-ion battery is charged and discharged at a high rate, the PCM cannot quickly absorb a large amount of heat generated by the battery due to the low thermal conductivity, resulting in a big jump of the battery temperature. By adding heat-conducting plates with high thermal conductivity into the PCM, and the heat is quickly transferred from the surface of the battery to the battery outer shell and in turn is quickly taken away by forced convection of the air in the heat exchange channel, thereby achieving rapid heat dissipation of the battery. This design effectively ensures that lithium-ion battery can obtain ideal working temperature and temperature gradient in its cell at different working environment temperatures and under high-rate charging and discharging conditions.

Figure 3:
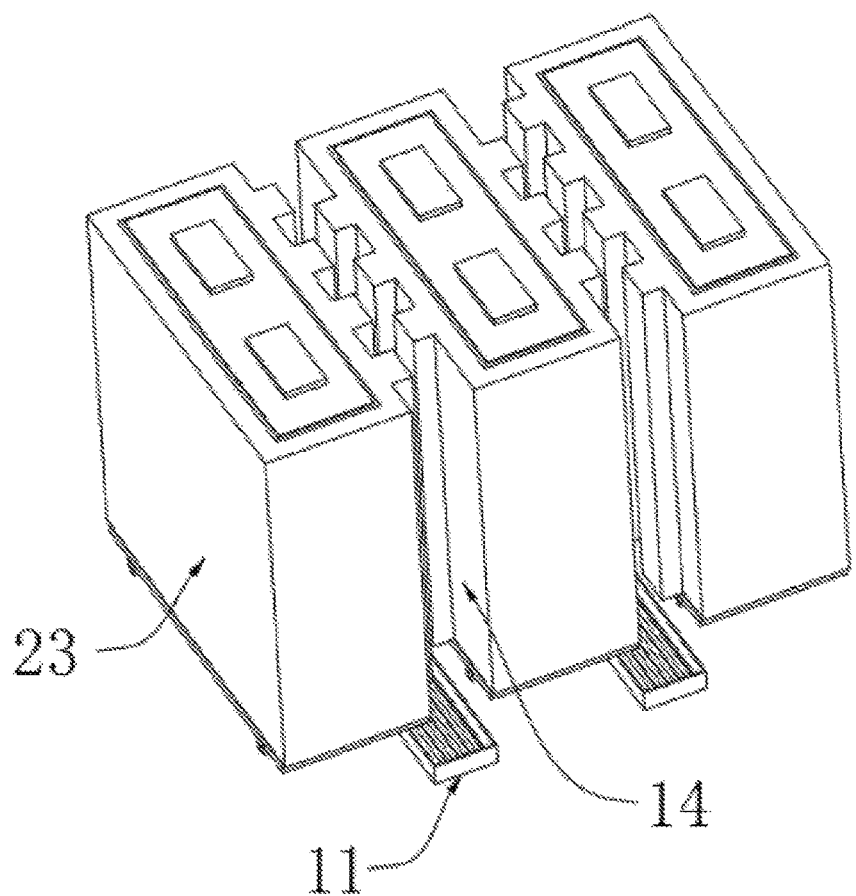
FIG. 3 is a schematic diagram of the positional relationship between a first heat exchange channel and a first incoming air unit.
Figure 4:
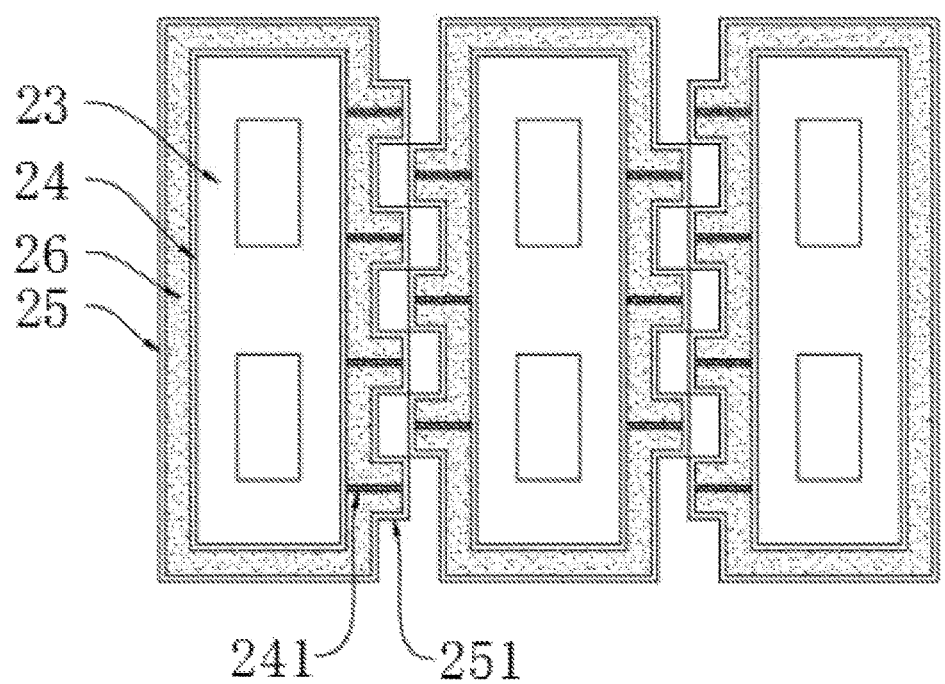
FIG. 4 is a schematic diagram of the structure principle of a lithium-ion battery pack.

As further improvement on the scheme, referring to FIG. 3, a first incoming air unit 11 is arranged on the inner side of the battery box 1. The first incoming air unit 1 is electrically connected with the controller. A vent of the first incoming air unit 11 is arranged at one end of the first heat exchange channel 14. A flow direction of air from the vent is consistent with the extension direction of the first heat exchange channel 14. Preferably, the surface of the battery box 1 is further provided with a first outgoing air unit (not shown in the figure). The first outgoing air unit is arranged at another end, away from the first incoming air unit 11, of the first heat exchange channel 14. The first incoming air unit 11 and the first outgoing air unit work together to at least enhance the heat transfer efficiency of the first heat exchange channel 14. That is, the first incoming air unit 11, the first outgoing air unit and the first heat exchange channel 14 can form an independent ventilation and heat exchange system.

Figure 2:
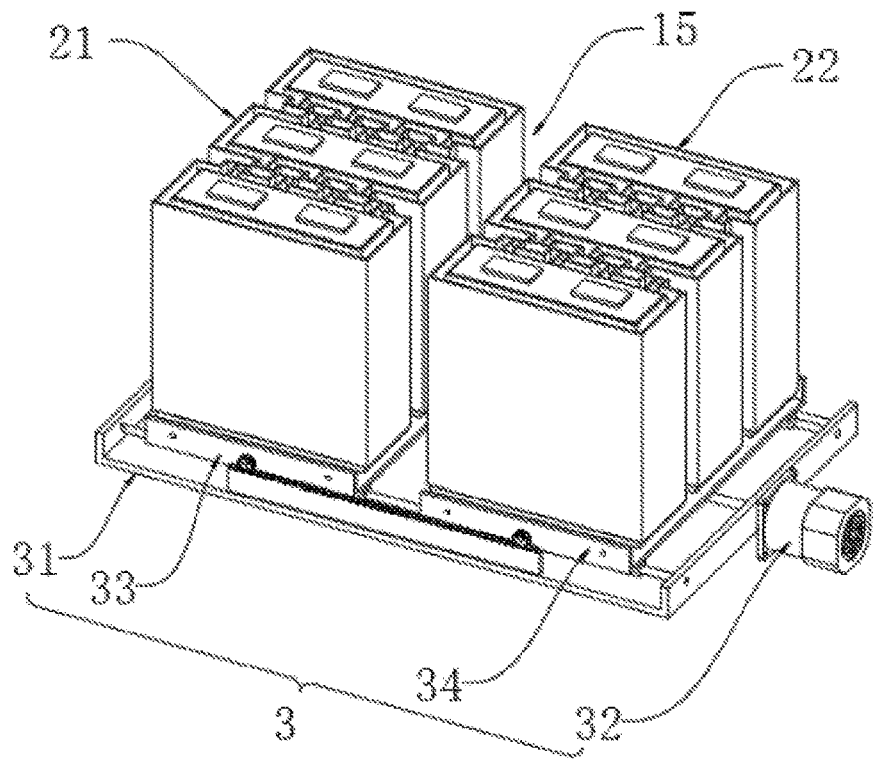
FIG. 2 is a schematic diagram of a stereostructure of a lithium-ion battery pack.

As further improvement on the scheme, referring to FIG. 1 and FIG. 2, the lithium-ion battery pack 2 further includes a first battery pack 21 and a second battery pack 22 which are arranged side by side, and at least two cells 23 are arranged in each battery pack. The driving device 3 is further configured for driving the first battery pack 21 and the second battery pack 22 to move towards or apart from each other. A second heat exchange channel 15 is formed after the first battery pack 21 and the second battery pack 22 move apart from each other. A third heat exchange channel 16 is formed between the battery box 1 and the lithium-ion battery pack 2. The heat dissipation capacity of the battery pack can be improved through the design of the heat exchange channels. Preferably, the surface of the battery box 1 is further provided with a second incoming air unit 12 and a second outgoing air unit 13. The second incoming air unit 12 and the second outgoing air unit 13 are electrically connected with the controller, to at least implement heat transfer between the air in the second heat exchange channel 15 and battery box 1 and the external air in the surrounding environment.

Embodiment I

The embodiment aims to provide one of preferable specific implementation structures of the first incoming air unit 11 and the first outgoing air unit. Referring to FIG. 3, the first incoming air unit 11 is preferably an air duct. The air duct is connected with an external cooling source and an external heat source, and is provided with a plurality of vents corresponding to each first heat exchange channel 14. The first outgoing air unit is arranged on the outer wall of the battery box 1. The cooling and heat sources can be arranged away from the battery box 1 to prevent the temperature of the battery box 1 from affecting the performance of the cold and heat source. If the battery box is installed on an electric vehicle, the air duct can be directly connected with the vehicle air conditioning system. Specifically, the first incoming air unit 11 can blow cold air or warm air into the first heat exchange channel 14 as required. That is, in the case of using air cooling, the heat is quickly taken away after the first heat exchange channel 14 is formed, so that the cooling demand about dissipating the battery heat in a high-temperature environment and/or high-rate charging and discharging conditions are preferably fulfilled. In the case of using air heating, warm air can be provided for performing thermal protection on the battery based on actual needs, when the latent heat of the PCM 26 is exhausted, and the temperature of the PCM 26 is almost the same as that of the surrounding environment, so that the battery can be applied in a cold environment. Through the design of air heating, heat can be supplied for the battery box 1 placed in a low-temperature environment for a long while and the battery pack in the box, and the temperature can rise to a reasonable value before the battery pack starts to work, so that thermal protection is preferably provided for the battery in the low-temperature environment.

Embodiment II

The embodiment aims to provide one of preferable specific implementation structures of the second incoming air unit 12 and the second outgoing air unit 13. The embodiment can assist the first embodiment to obtain better heat dissipation effect and thermal preservation effect, and can be used as a supplementary scheme of the first embodiment. Referring to FIG. 1, the second incoming air unit 12 is preferably a cooling fan. The cooling fan sends cold air outside the battery box 1 into the second heat exchange channel 15 and/or the third heat exchange channel 16, and can control the flow rate of the incoming air. The second outgoing air unit 13 is preferably an electric window shutter. The electric window shutter discharges hot air after the air absorbs the heat in the second heat exchange channel 15 and/or the third heat exchange channel 16, and can adjust the opening degree and the flow direction of air from the vent. Preferably, an electric heating wire is arranged between the cooling fan and the battery box 1 to blow the warm air into the battery box 1 by means of the cooling fan. The cooling fan, the electric window shutter and the heat exchange channel form an air cooling system. The effective cooling effect of the battery can be further ensured according to the actual needs when the thermal absorption capacity and/or the thermal absorption rate of the PCM 26 are weakened after the PCM 26 is completely liquefied at a high temperature. The air cooling system is suitable for the battery working in a scorching environment or under the high discharging-rate conditions. The cooling fan, the electric heating wire, the electric window shutter and the heat exchange channel form an air heating system. The thermal protection capacity of the battery can be further improved according to the actual needs when the latent heat of the PCM 26 is exhausted and the temperature of the PCM 26 is almost the same as that of the surrounding environment. The air heating system is suitable for the working condition that the battery placed in a cold environment for a long while is started or works.

Embodiment III

The embodiment aims to provide one of preferable specific implementation structures of the driving device 3. Referring to FIG. 2 and FIG. 5 to FIG. 7, the driving device 3 includes a base 31. The base 31 is arranged on the inner surface of the bottom of the battery box 1. The base 31 is rotatably connected with a first bidirectional screw rod 311. One end of the first bidirectional screw rod 311 penetrates through the battery box 1 and then is in transmission connection with a motor 32. The motor 32 is electrically connected with the controller. The motor 32 is arranged on the outer side of the battery box 1 to ensure its heat dissipation, and meanwhile, the outline size of the battery box 1 can be reduced. Wherein, the two ends of the first bidirectional screw rod 311 are in threaded connection with a first sliding seat 33 and a second sliding seat 34, respectively. The first sliding seat 33 and the second sliding seat 34 have the same structure and are slidably connected with the base 31. The second sliding seat 34 is rotatably connected with a second bidirectional screw rod 341. The two ends of the second bidirectional screw rod 341 are equipped with gears 342. Racks 312 are fixed at the edges on the two sides of the base 31. The racks 312 mesh with the gears 342. The two ends of the second bidirectional screw rod 341 are in threaded connection with a first dragging plate 35 and a second dragging plate 36, respectively. The first dragging plate 35 and the second dragging plate 36 are slidably connected with the second sliding seat 34. The cells 23 are placed on the top surface of the first dragging plate 35 and the top surface of the second dragging plate 36, respectively. According to the device, the first sliding seat 33 and the second sliding seat 34 are driven to slide towards or apart from each other by the rotation of the first bidirectional screw rod 311, and then the face-to-face movement or back-to-back movement of the first battery pack 21 and the second battery pack 22 is realized. When the sliding seat slides, the gears 342 on the two sides of the sliding seat rotate on the racks 312 in a meshed manner, and then the second bidirectional screw rod 341 in threaded connection to the sliding seat is driven to rotate. The first dragging plate 35 and the second dragging plate 36 are driven to slide towards or apart from each other by the rotation of the second bidirectional screw rod 341, and then the face-to-face movement or back-to-back movement of the adjacent cells 23 in the same battery pack is realized. That is, the driving device 3 completes the face-to-face or back-to-back movement of the four cells 23 in the lithium-ion battery pack 2 by only one rotating motor, so that simultaneous opening and closing of the first heat exchange channel 14 and the second heat exchange channel 15 are realized.

Figure 7:
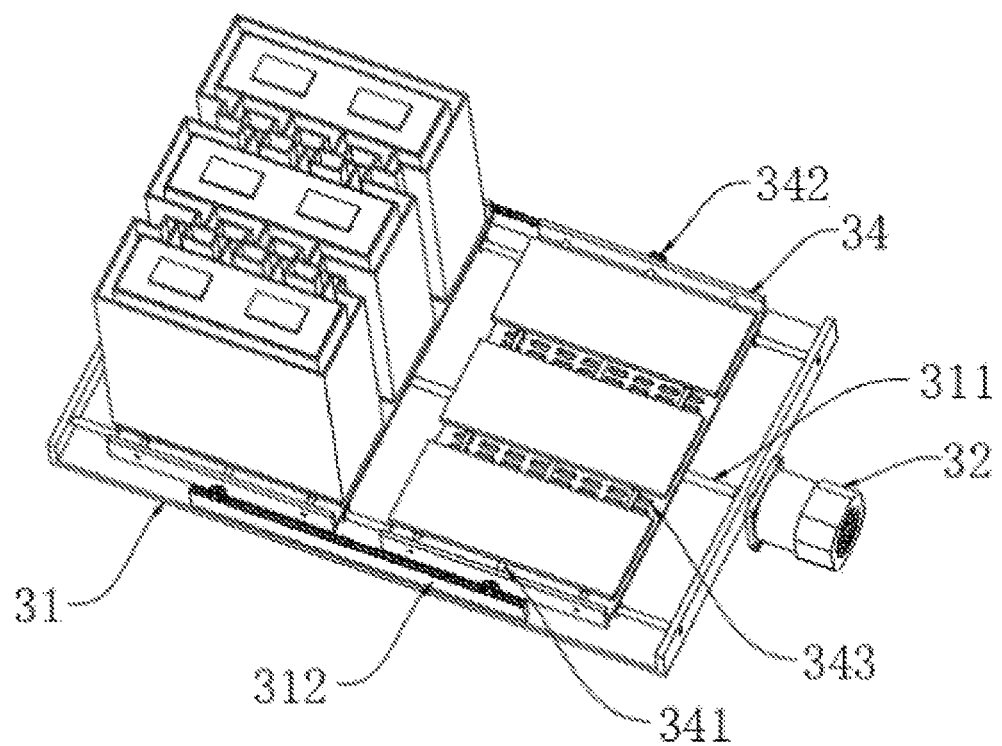
FIG. 7 is a structural schematic diagram of a second sliding seat.

In the embodiment, preferably, referring to FIG. 7, the fins 251 are vertically arranged. A plurality of first ventilation holes 343 are formed on the surface of the second sliding seat 34. The positions of the first ventilation holes 343 correspond to the first heat exchange channel 14, so that when the first heat exchange channel 14 is opened, the first heat exchange channel 14 is connected with the first ventilation holes 343 for air circulation. Optionally, the first incoming air unit 11 can be arranged at the bottom of the battery box 1, and its vent is connected with the first ventilation holes 343, so that the air for heat exchange can flow from the bottom to top in the first heat exchange channel 14. At that time, a plurality of second ventilation holes (not shown in the figure) corresponding to the position of the first heat exchange channel 14 can be formed on the top surface of the battery box 1, so that the first incoming air unit 11 can directly exhaust the air in the first heat exchange channel 14 from the top of the battery box 1 through these second ventilation holes. Obviously, the first incoming air unit 11 can also be arranged on the top of the battery box 1, and the vent is connected with the first heat exchange channel 14, so that the warm air can flow from the top to bottom in the first heat exchange channel 14. The first ventilation holes 343 are taken as extension channels of the first heat exchange channel 14 so as to prevent the air circulation from being blocked by the second sliding seat 34. Further, a plurality of third ventilation holes (not shown in the figure) corresponding to the position of the first heat exchange channel 14 can be formed in the bottom of the battery box 1, and the third ventilation holes penetrate through the base 31, so that the first incoming air unit 11 can directly exhaust the air in the first heat exchange channel 14 from the bottom of the battery box 1 through the first ventilation holes 343 and the third ventilation holes. Particularly, the second ventilation holes or the third ventilation holes penetrating through the battery box 1 need to be provided with a movable baffle to seal these through holes and reduce the heat loss of the battery box to the external surroundings when thermal protection of the battery is performed at low temperatures. Thus, the first incoming air unit 11, the second ventilation holes or the third ventilation holes, and the first heat exchange channel 14 can form an independent ventilation and heat exchange system. The second incoming air unit 12, the second outgoing air unit 13, and the third heat exchange channel 16 can form another independent ventilation and heat exchange system. The two ventilation and heat exchange systems can be adopted simultaneously or alternatively. If the two ventilation and heat exchange systems are selected simultaneously, the starting sequence can be set according to the actual needs. In addition, if the two ventilation and heat exchange systems are used at the same time, since the first heat exchange channel 14, the second heat exchange channel 15 and the third heat exchange channel 16 are all connected with one another, they can share one outgoing air unit.

Embodiment IV

Figure 5:
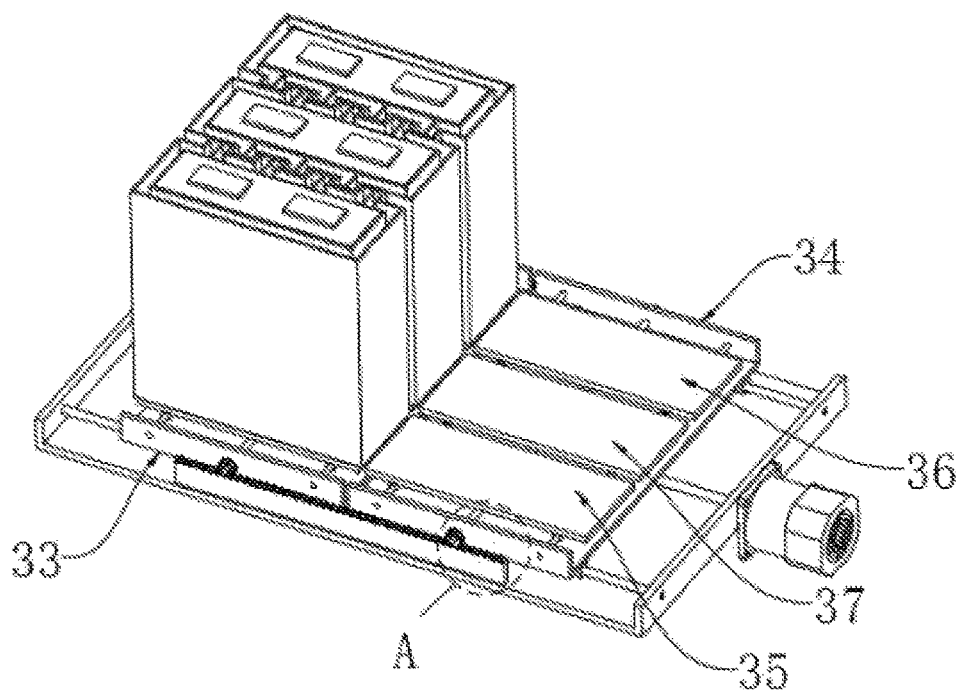
FIG. 5 is a structural schematic diagram of a driving device.
Figure 6:
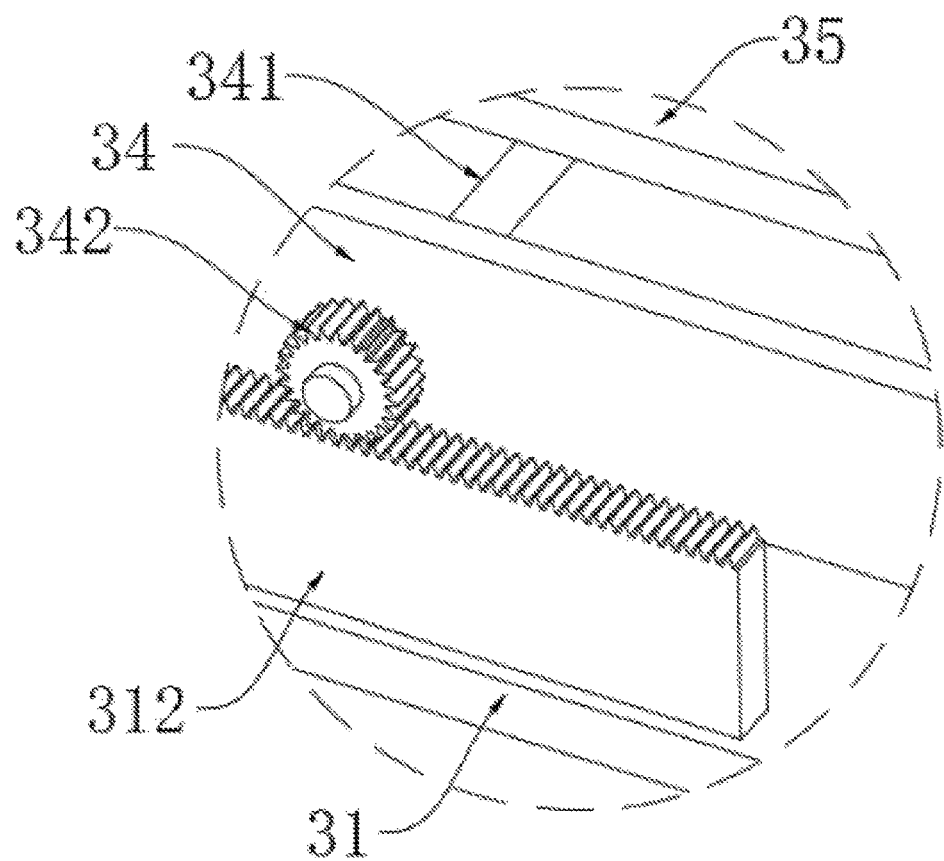
FIG. 6 is an enlarged view at the position of A in FIG. 5.

The embodiment is further improvement on the basis of the third embodiment. The third embodiment only realizes the face-to-face or back-to-back movement of the four cells 23. If more cells 23 need to be installed in the battery box 1, the following improvement can be made. Referring to FIG. 5, the top surface of the second sliding seat 34 is further fixedly provided with an immovable plate 37. The immovable plate 37 is located between the first dragging plate 35 and the second dragging plate 36. The cell 23 is also placed on the top surface of the immovable plate 37. When the first sliding seat 33 and the second sliding seat 34 are away from each other, the first dragging plate 35 and the second dragging plate 36 on the two sides of the immovable plate 37 are also away from each other. That is, the cell 23 on the first dragging plate 35 is away from the cell 23 on the immovable plate 37, and the cell 23 on the second dragging plate 36 is also away from the cell 23 on the immovable plate 37, so that three cells 23 can be placed on one sliding seat.

Embodiment V

The embodiment is further improvement on the basis of the fourth embodiment. The fourth embodiment only realizes the face-to-face or back-to-back movement of the six cells 23. If more cells 23 need to be installed in the battery box, the following improvement can be made.

The first dragging plate at least includes a first dragging plate a and a first dragging plate b. The first dragging plate b is arranged between the first dragging plate a and the second dragging plate. The screw pitch at the threaded connection between the first dragging plate a and the second bidirectional screw rod is 1.5-3 times of that at the threaded connection between the first dragging plate b and the second bidirectional screw rod. Preferably, the second bidirectional screw rod includes a first rotating section a, a first rotating section b, a clearance section, a second rotating section b and a second rotating section a which are connected in sequence. The screw pitch of the first rotating section a is twice of that of the first rotating section b. That is, after the second bidirectional screw rod rotates by one circle, the sliding distance of the first dragging plate a in threaded connection with the first rotating section a is twice of that of the first dragging plate b in thread connection with the first rotating section b, and then the same distance for heat dissipation is maintained after the adjacent cells in the same battery pack are separated from each other. Obviously, only the first dragging plate a and the first dragging plate b can be connected to the second bidirectional screw rod. That is, only the unidirectional screw rod with the same spiral direction can realize that the adjacent cells move towards or apart from each other, which is not described here.

The present disclosure further provides a management method of the lithium-ion battery thermal management system based on PCM and mutually embedded fins. Since the management method adopts the lithium-ion battery thermal management system based on a PCM and mutually embedded fins in any of the above-mentioned embodiments, the above-mentioned embodiments are preferred for the beneficial effects of the management method. Specifically, the management method includes the following steps:

detecting the real-time temperature of the surface of at least one cell 23 by the temperature detection unit, and transmitting the real-time temperature to the controller; the following judgments are made by the controller based on the received real-time temperature.

When the real-time temperature is less than or equal to a second predetermined temperature, the controller detects the current position state of the cell 23, controls the cell 23 to keep at the current position state if the cell 23 is at the thermal preservation position, and controls the driving device 3 to drive the cell 23 to be switched to the thermal preservation position if the cell 23 is at the heat exchange position.

When the real-time temperature is greater than the second predetermined temperature and less than a third predetermined temperature, the controller controls the cell 23 to keep at the current position state.

When the real-time temperature is greater than or equal to a third predetermined temperature, the controller detects the current position state of the cell 23, controls the cell 23 to keep at the current position state if the cell 23 is at the heat exchange position, and controls the driving device 3 to drive the cell 23 to be switched to the heat exchange position if the cell 23 is at the thermal preservation position.

Wherein, the second predetermined temperature is greater than the minimum temperature at which the lithium-ion battery is allowed to operate normally and less than the third predetermined temperature, and the third predetermined temperature is less than the maximum temperature at which the lithium-ion battery is allowed to operate normally.

Specially, the current actual position of the cell needs to be detected before the position state of the cell is switched every time. On one hand, when the battery is in the operating or idle mode, such detections can prevent the driving device from being blocked during executing a current action and even prevent the motor from being overloaded and burned, caused by the error of the preorder program instruction and/or the error of the preorder operation. On the other hand, when the battery box is in the shutdown state, the active measures for thermal preservation or heat dissipation are closed for the power-saving protection and other reasons, resulting in cleared or missing records of the controller for the preorder operation instructions. Therefore, the controller needs to re-identify the current actual position of the cell, and then the thermal preservation or heat dissipation instruction can be given. In one embodiment, the rotating motor is a stepping motor. When the position detection of the cell is carried out, the stepping motor rotates by 0.9 degrees or 1.8 degrees according to the instruction given by the controller, and the controller can confirm the current actual position state of the cell based on the received current change fed back by the stepping motor. In another embodiment, a distance sensor is arranged in the first heat exchange channel. The distance sensor detects the relative position of the first sliding seat and/or the second sliding seat in the first heat exchange channel. The controller can judge the current actual position state of the cell based on the electric signal returned by the distance sensor.

In one embodiment, the embodiment aims to elaborate one of the application examples of the above-mentioned management method. According to the experimental data, it is known that the current normal working temperature range of the lithium-ion battery is 25-50° C., so that the second predetermined temperature is 25° C., the melting point of PCM is 27° C., and the third predetermined temperature is 30° C. The following situations are specifically represented as below.

When the temperature detection unit detects that the battery temperature is less than or equal to 25° C., it indicates that the environment temperature of the battery box is low and the latent heat of the PCM has been released. In order to prevent the battery temperature from being further decreased, the controller gives the thermal preservation instruction. That is, the driving device is controlled to drive the cell to be switched to the thermal preservation position to reduce the heat dissipation.

When the temperature detection unit detects that the battery temperature is between 25° C. and 30° C., it indicates that the environment temperature of the battery box is suitable for battery operation, and the battery temperature is in a dynamic balance state. The normal operation of the battery is not affected no matter in the thermal preservation position or the heat exchange position, and the controller does not need to give a temperature control instruction. At that time, the heat generated during the battery operation is absorbed by the PCM. When the temperature of the PCM rises up to the melting point, phase change melting occurs inside the PCM, so that a large amount of heat is further absorbed, and the temperature of the battery pack is stabilized.

When the temperature detection unit detects that the battery temperature is greater than or equal to 30° C., it indicates that the environment temperature of the battery box is high and/or the battery is in a high-rate charging and discharging condition (namely, the battery generates heat quickly), and the PCM has been completely melted into liquid, and its thermal absorption capacity or thermal absorption rate is weakened. In order to enhance the heat dissipation of the battery, the controller gives the heat dissipation instruction. That is, the driving device is controlled to drive the cells to be switched to the heat exchange position, and the cells are separated from each other and fully exposed to the surrounding air, respectively, so that the heat dissipation capacity of the battery to the surrounding environment is improved.

As further improvement on the above-mentioned scheme, the following judgments are made by the controller based on the received real-time temperature.

When the real-time temperature is greater than or equal to a fourth predetermined temperature, the controller is further used for controlling the start of the first incoming air unit 11 and introducing a cooling medium into the first heat exchange channel 14; wherein, the fourth predetermined temperature is greater than the third predetermined temperature, but still less than the maximum temperature at which the lithium-ion battery is allowed to operate normally.

When the real-time temperature is less than or equal to a first predetermined temperature, the controller detects the current position state of the cell 23, controls the cell 23 to keep at the current position state if the cell 23 is at the heat exchange position, and controls the driving device 3 to drive the cell 23 to be switched to the heat exchange position if the cell 23 is at the thermal preservation position; and meanwhile, the controller is further used for controlling the start of the first incoming air unit 11 and introducing a heating medium into the first heat exchange channel 14; wherein, the first predetermined temperature is less than the second predetermined temperature.

In one specific application example, according to the experimental data, it is known that the current normal working temperature range of the lithium-ion battery is 25-50° C., so that the first predetermined temperature is 5° C., the second predetermined temperature is 25° C., the melting point of PCM is 27° C., the third predetermined temperature is 30° C., and the fourth predetermined temperature is 40° C. The following situations are specifically represented as follows.

When the temperature detection unit detects that the battery temperature is less than or equal to 25° C., it indicates that the environment temperature of the battery box is low and the latent heat of the PCM has been released. In order to prevent the battery temperature from being further decreased, the controller gives the thermal preservation instruction. That is, the driving device is controlled to drive the cells to be switched to the thermal preservation position, and the cells move towards each other and then attach each other to reduce the heat loss of the battery pack to the external environment.

When the temperature detection unit detects that the battery temperature is further decreased and is lower than 5° C., it indicates that the temperature of the environment, where the battery box, the battery pack and the PCM are located, is low, and the latent heat of the PCM has been almost exhausted or completely released. The controller gives a forced instruction to raise the battery temperature. That is, the driving device 3 is controlled to drive the cells 23 to be switched to the heat exchange position, and the cells are separated from each other to form the first heat exchange channel, and the first incoming air unit is controlled to start. Warm air is blown into the first heat exchange channel formed after the adjacent cells are separated from each other, the heat is supplied to the battery in turn through the fin structures, and then the temperature of the battery pack in the box rises, so that the needs of thermal protection for the battery and its cold start in the low-temperature environment are preferably met.

When the temperature detection unit detects that the battery temperature is between 25° C. and 30° C., it indicates that the environment temperature of the battery box is suitable for battery operation, and the battery temperature is in a dynamic balance state. The normal operation of the battery is not affected no matter in the thermal preservation position or the heat exchange position, and the controller does not need to give a temperature control instruction. At that time, the heat generated during the battery operation is absorbed by the PCM. When the temperature of the PCM rises up to the melting point, phase change melting occurs inside the PCM, so that a large amount of heat is further absorbed, and the temperature of the battery pack is stabilized.

When the temperature detection unit detects that the battery temperature is greater than or equal to 30° C., it indicates that the environment temperature of the battery box is high and/or the battery is in a high-rate charging and discharging condition (namely, the battery generates heat quickly), and the PCM has been completely melted into liquid, and its thermal absorption capacity or thermal absorption rate is weakened. In order to enhance the heat dissipation of the battery, the controller gives the heat dissipation instruction. That is, the driving device is controlled to drive the cells to be switched to the heat exchange position, and the cells are separated from each other and fully exposed to the surrounding air, respectively, so that the heat dissipation capacity of the battery to the surrounding environment is improved.

When the temperature detection unit detects that the battery temperature is further raised and is greater than 40° C., it indicates that the cooling effects of the preorder heat dissipation measures are not good. In order to avoid further growth in the battery temperature, the controller gives a compensation instruction for heat dissipation. That is, the first incoming air unit is controlled to start, and cold air is blown into the first heat exchange channel formed after the adjacent cells are separated from each other, so that the heat on the fin surfaces is quickly taken away, and the cooling demand of the battery in the high-temperature environment is preferably met.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A lithium-ion battery thermal management system based on a phase change material (PCM) and mutually embedded fins, comprising:
   a battery box, a lithium-ion battery pack and a temperature detection unit being arranged in the battery box, and the temperature detection unit being electrically connected with a controller;
   wherein the lithium-ion battery pack at least comprises two cells, a periphery of each cell is wrapped with a battery inner shell and a battery outer shell, and the PCM is filled between the battery inner shell and the battery outer shell;
   wherein a plurality of fins are arranged on the battery outer shell on the opposite sides of the two adjacent cells, the fins are arranged at intervals, the fins on the opposite sides of the two adjacent cells are arranged in a staggered manner, and heat-conducting plates are connected between each fin and the battery inner shell;
   the thermal management system further comprising a driving device, and the driving device is electrically connected with the controller and configured for driving the two adjacent cells to move towards or apart from each other so that the two adjacent cells are at least arranged at a heat exchange position or a thermal preservation position;
   when the two adjacent cells are at the heat exchange position, the fins, which are located on the opposite sides of two adjacent cells and are arranged in a staggered manner, are separated from each other to form a first heat exchange channel;
   when two adjacent cells are at the thermal preservation position, the fins, which are located on the opposite sides of the two adjacent cells and are arranged in a staggered manner, move towards each other and are mutually embedded to close the first heat exchange channel;

wherein a first incoming air unit is arranged on the inner side of the battery box, the first incoming air unit is electrically connected with the controller, a vent of the first incoming air unit is arranged at one end of the first heat exchange channel, and air from the vent flows along the first heat exchange channel;

wherein the lithium-ion battery pack further includes a first battery pack and a second battery pack which are arranged side by side, and at least two cells are arranged in each battery pack; the driving device is further configured for driving the first battery pack and the second battery pack to move towards or apart from each other; and a second heat exchange channel is formed after the first battery pack and the second battery pack move apart from each other; and wherein the driving device includes a base, the base is arranged on the inner surface of the bottom of the battery box, the base is rotatably connected with a first bidirectional screw rod, one end of the first bidirectional screw rod penetrates through the battery box and then is in transmission connection with a motor, and the motor is electrically connected with the controller; two ends of the first bidirectional screw rod are in threaded connection with a first sliding seat and a second sliding seat, respectively, and the first sliding seat and the second sliding seat have the same structure and are slidably connected with the base; the second sliding seat is rotatably connected with a second bidirectional screw rod, two ends of the second bidirectional screw rod are equipped with gears, racks are fixed at edges on two sides of the base, and the racks mesh with the gears; and the two ends of the second bidirectional screw rod are in threaded connection with a first dragging plate and a second dragging plate, respectively, the first dragging plate and the second dragging plate are respectively slidably connected with the second sliding seat, and the cells are placed on the top surface of the first dragging plate and the top surface of the second dragging plate, respectively.

2. The lithium-ion battery thermal management system based on PCM and mutually embedded fins according to claim 1, wherein a first outgoing air unit is arranged on the surface of the battery box, the first outgoing air unit is arranged at another end, away from the first incoming air unit, of the first heat exchange channel, and the first incoming air unit and the first outgoing air unit work together to at least increase heat transfer efficiency of the first heat exchange channel.

3. The lithium-ion battery thermal management system based on PCM and mutually embedded fins according to claim 1, wherein the surface of the battery box is further provided with a second incoming air unit and a second outgoing air unit, the second incoming air unit and the second outgoing air unit are electrically connected with the controller, to at least implement heat transfer between air in the second heat exchange channel and battery box and external air in surrounding environment.

4. The lithium-ion battery thermal management system based on PCM and mutually embedded fins according to claim 3, wherein the driving device comprises a base, the base is arranged on the inner surface of the bottom of the battery box, the base is rotatably connected with a first bidirectional screw rod, one end of the first bidirectional screw rod penetrates through the battery box and then is in transmission connection with a motor, and the motor is electrically connected with the controller; two ends of the first bidirectional screw rod are in threaded connection with a first sliding seat and a second sliding seat, respectively, and the first sliding seat and the second sliding seat have same structure and are slidably connected with the base; the second sliding seat is rotatably connected with a second bidirectional screw rod, two ends of the second bidirectional screw rod are equipped with gears, racks are fixed at the edges on the two sides of the base, and the racks mesh with the gears; and the two ends of the second bidirectional screw rod are in threaded connection with a first dragging plate and a second dragging plate, respectively, the first dragging plate and the second dragging plate are respectively slidably connected with the second sliding seat, and the cells are placed on the top surface of the first dragging plate and the top surface of the second dragging plate, respectively.

5. The lithium-ion battery thermal management system based on PCM and mutually embedded fins according to claim 1, wherein an immovable plate is fixed at a top surface of the second sliding seat, the immovable plate is located between the first dragging plate and the second dragging plate, and a cell is also placed on the top surface of the immovable plate.

6. The lithium-ion battery thermal management system based on PCM and mutually embedded fins according to claim 4, wherein an immovable plate is fixed at a top surface of the second sliding seat, the immovable plate is located between the first dragging plate and the second dragging plate, and a cell is also placed on the top surface of the immovable plate.

7. A management method of the lithium-ion battery thermal management system based on PCM and mutually embedded fins according to claim 1, the method comprising the following steps:

detecting a real-time temperature of the surface of at least one cell by the temperature detection unit, and transmitting the real-time temperature to the controller, wherein the controller makes following judgments based on the received real-time temperature:

when the real-time temperature is less than or equal to a second predetermined temperature, the controller detects the current position state of the cell, controls the cell to keep at the current position state if the cell is at the thermal preservation position, and controls the driving device to drive the cell to be switched to the thermal preservation position if the cell is at the heat exchange position; or when the real-time temperature is greater than the second predetermined temperature and less than a third predetermined temperature, the controller controls the cell to keep at the current position state; or when the real-time temperature is greater than or equal to a third predetermined temperature, the controller detects the current position state of the cell, controls the cell to keep at the current position state if the cell is at the heat exchange position, and controls the driving device to drive the cell to be switched to the heat exchange position if the cell is at the thermal preservation position;

wherein, the second predetermined temperature is greater than the minimum temperature at which the lithium-ion battery is allowed to operate normally and less than the third predetermined temperature, and the third predetermined temperature is less than the maximum temperature at which the lithium-ion battery is allowed to operate normally;

wherein following judgments are made by the controller based on the received real-time temperature: when the real-time temperature is greater than or equal to a fourth predetermined temperature, the controller is further configured for controlling start of the first incoming air unit and introducing a cooling medium into the first heat exchange channel;

the fourth predetermined temperature is greater than the third predetermined temperature, but still less than the maximum temperature at which the lithium-ion battery is allowed to operate normally;

wherein following judgments are made by the controller based on the received real-time temperature:

when the real-time temperature is less than or equal to a first predetermined temperature, the controller detects the current position state of the cell, controls the cell to keep at the current position state if the cell is at the heat exchange position, and controls the driving device to drive the cell to be switched to the heat exchange position if the cell is at the thermal preservation position; and further, the controller is further configured for controlling the start of the first incoming air unit and introducing a heating medium into the first heat exchange channel;

the first predetermined temperature is less than the second predetermined temperature.

\* \* \* \* \*